(12) United States Patent
Simpson

(10) Patent No.: US 7,441,792 B2
(45) Date of Patent: Oct. 28, 2008

(54) TRAILER WITH CONVERTIBLE HANDLE

(75) Inventor: Dennis Simpson, Minnetonka, MN (US)

(73) Assignee: Tricam Industries, Inc., Eden Prairie, MN (US)

( * ) Notice: Subject to any disclaimer, the term of this patent is extended or adjusted under 35 U.S.C. 154(b) by 0 days.

(21) Appl. No.: 11/655,447

(22) Filed: Jan. 19, 2007

(65) Prior Publication Data

US 2007/0138759 A1    Jun. 21, 2007

Related U.S. Application Data

(63) Continuation of application No. 11/014,247, filed on Dec. 16, 2004, now Pat. No. 7,210,697.

(51) Int. Cl.
*B60F 5/00* (2006.01)
*B60D 1/07* (2006.01)
*B62B 3/00* (2006.01)

(52) U.S. Cl. .............. 280/415.1; 280/47.34; 280/47.36; 280/47.371; 280/416.1; 16/405; 16/406; 16/426; 16/444; 16/446

(58) Field of Classification Search .............. 280/47.34, 280/47.36, 47.371, 415.1, 416.1; 16/405, 16/406, 426, 444, 446
See application file for complete search history.

(56) References Cited

U.S. PATENT DOCUMENTS

| | | | |
|---|---|---|---|
| 1,954,179 A * | 4/1934 | Krug | ........................... 280/204 |
| 2,210,292 A | 8/1940 | Hodgkin | |
| 2,399,043 A | 4/1946 | Klumb | |
| 2,760,790 A | 8/1956 | Andrews | |
| 2,794,657 A | 6/1957 | Anderson | |
| 3,091,967 A | 6/1963 | Hurdlow | |
| 3,100,120 A | 8/1963 | Cleary | |
| 3,130,443 A | 4/1964 | Tonelli | |
| 4,037,853 A | 7/1977 | Sparks | |
| 4,227,709 A | 10/1980 | Gradwohl et al. | |
| 4,277,075 A | 7/1981 | Shay | |
| 4,645,224 A | 2/1987 | Poganski | |
| 4,953,886 A | 9/1990 | Grant | |
| 5,180,179 A | 1/1993 | Salvucci | |
| 5,257,892 A | 11/1993 | Branch | |
| 5,319,829 A | 6/1994 | Manuel | |
| 5,337,609 A | 8/1994 | Hsu | |
| 5,529,323 A | 6/1996 | Vom Braucke et al. | |
| 5,669,617 A | 9/1997 | Pasin et al. | |
| 5,906,452 A | 5/1999 | Lee | |
| 5,941,585 A | 8/1999 | McAlister | |
| 6,182,988 B1 | 2/2001 | Wu | |
| 6,409,188 B1 | 6/2002 | Hesmer | |
| 6,868,581 B2 | 3/2005 | Browder | |
| 2002/0096857 A1 | 7/2002 | Valdez et al. | |

* cited by examiner

*Primary Examiner*—Joanee Silbermann
*Assistant Examiner*—Marc A Scharich
(74) *Attorney, Agent, or Firm*—Patterson, Thuente, Skaar & Christensen, P.A.

(57) ABSTRACT

A trailer includes a convertible handle having a handle portion, the handle portion pivotally attached to a tongue portion, the handle portion having a first gripping portion end and a second clevis end and an intermediate pivot, the handle portion being pivotably shiftable about the pivot between a first disposition presenting the gripping portion end proximate an end of the tongue portion and a second disposition presenting the clevis end proximate the end of the tongue portion. A method of operating a trailer is further included.

19 Claims, 4 Drawing Sheets

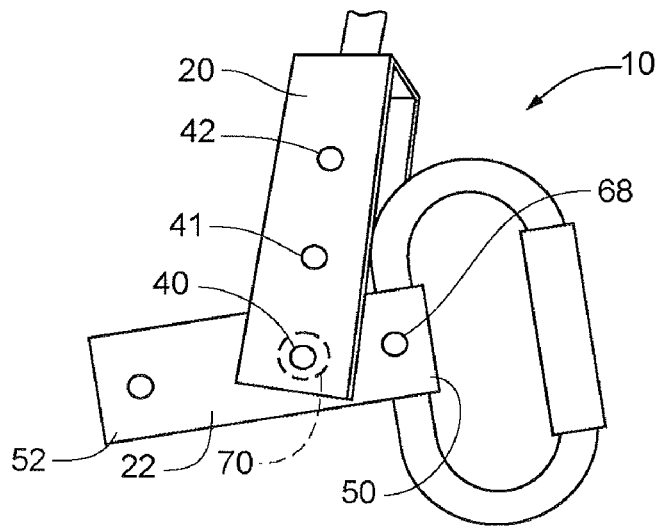
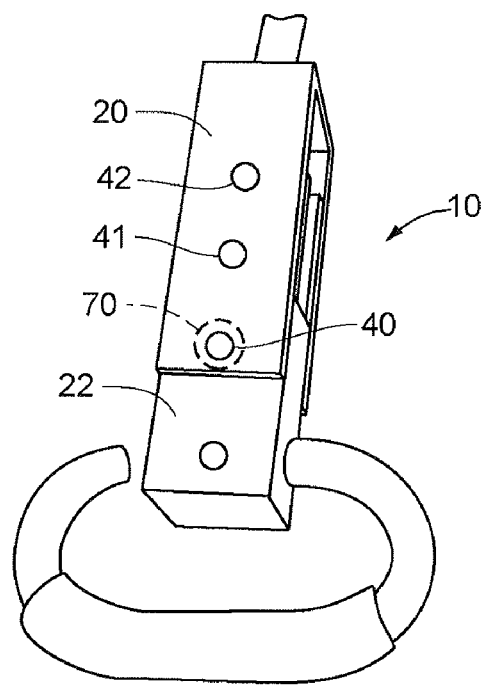

TRAILER WITH CONVERTIBLE HANDLE

RELATED APPLICATIONS

The present application is a continuation of U.S. patent application Ser. No. 11/014,247, filed Dec. 16, 2004, now U.S. Pat. No. 7,210,697 and included herein in its entirety by reference.

FIELD OF THE INVENTION

The present invention generally pertains to a trailer. More specifically, the present invention pertains to a trailer with a convertible handle.

BACKGROUND OF THE INVENTION

It is common to attach a towed vehicle such as a trailer to a towing vehicle by use of a rigid member with an articulating connection at the points of attachment to the vehicles. Many methods are used for making the attachment. For example, heavy trailers are often connected with the pintle arrangement discussed in U.S. Pat. No. 5,941,585. Lighter trailers for highway use are often connected with a ball and hitch apparatus as shown U.S. Pat. No. 4,645,224.

For still lighter towed vehicles, however, the connection is often simpler. Light utility trailers for off-highway use, such as a trailer for a garden tractor for example, are often connected with a simple pin connection. For instance, the pin connection can take the form of a rigid tongue member connected at one end to the towed vehicle and having a hitch consisting of a clevis at the other end. The clevis has a hole or aperture through each branch of the clevis. The towing vehicle is provided with a projecting tab at its rear side also having a hole or aperture through it. When the clevis end of the tongue is mated with the tab projecting from the towing vehicle, the holes can be aligned and a pin inserted to couple the two vehicles together.

Tight maneuvering, especially backing, of a towed vehicle while connected to the towing vehicle is often difficult. Also, it is sometimes desirable to move a towed vehicle in places where the towing vehicle cannot go. Accordingly, it is sometimes necessary to manually pull and maneuver a towed vehicle. The apparatus used for connecting the tongue of the towed vehicle to the towing vehicle, however, is normally not conducive to gripping with the human hand. For that reason, various apparatus have been designed over time to provide detachable handles for use with a tongue of a towed vehicle.

For pintle towed trailers, the handle described in U.S. Pat. No. 5,941,585 attaches to the pintle ring, allowing two persons to lift the tongue and maneuver the trailer. This device, however, is suitable only for pintle type connections.

For lighter trailers using a ball and hitch, the handle of U.S. Pat. No. 4,645,224 can be attached to the tongue member, allowing one or two persons to lift and maneuver the trailer. The spring-loaded, twist-locking arrangement of this apparatus, however, requires the tongue member to have a somewhat large cross-section to accommodate the apparatus. Towed vehicles light enough to use a pin-connection type hitch generally do not use a tongue having a large cross section. Accordingly, such a handle is usually not suitable for use with a lighter towed vehicle.

What is needed in the industry is a trailer with a convertible handle that readily converts from a graspable handle for manual pulling by a user to a clevis for ready coupling to a powered vehicle such as a lawn tractor or an ATV.

SUMMARY OF THE INVENTION

The present invention substantially meets the aforementioned needs of the industry. The trailer includes a handle that is readily convertible from a disposition presenting a loop type handle, preferably with a grip, that may be readily grasped by a user for manual pulling the trailer to a disposition present a clevis for the ready coupling of the trailer to a vehicle by means of a clevis pin. Such convertible handle greatly enhances the utility of the trailer as compared to known trailers, being both readily manually and vehicle towed, as desired. Additionally all the components that enable both manual and vehicle towing are self contained with no component requiring separate storage in either of the towing configurations.

The present invention is a trailer, the trailer including a convertible handle having a handle portion, the handle portion pivotally attached to a tongue portion, the handle portion having a first gripping portion end and a second clevis end and an intermediate pivot, the handle portion being pivotably shiftable about the pivot between a first disposition presenting the gripping portion end proximate an end of the tongue portion and a second disposition presenting the clevis end proximate the end of the tongue portion. The present invention is further a method of operating a trailer.

BRIEF DESCRIPTION OF THE DRAWINGS

FIG. 6 is a top view of the convertible handle in an intermediate configuration.

FIG. 7 is a top view of an alternative embodiment of the convertible handle.

DETAILED DESCRIPTION OF THE PREFERRED EMBODIMENTS

Figure 1:
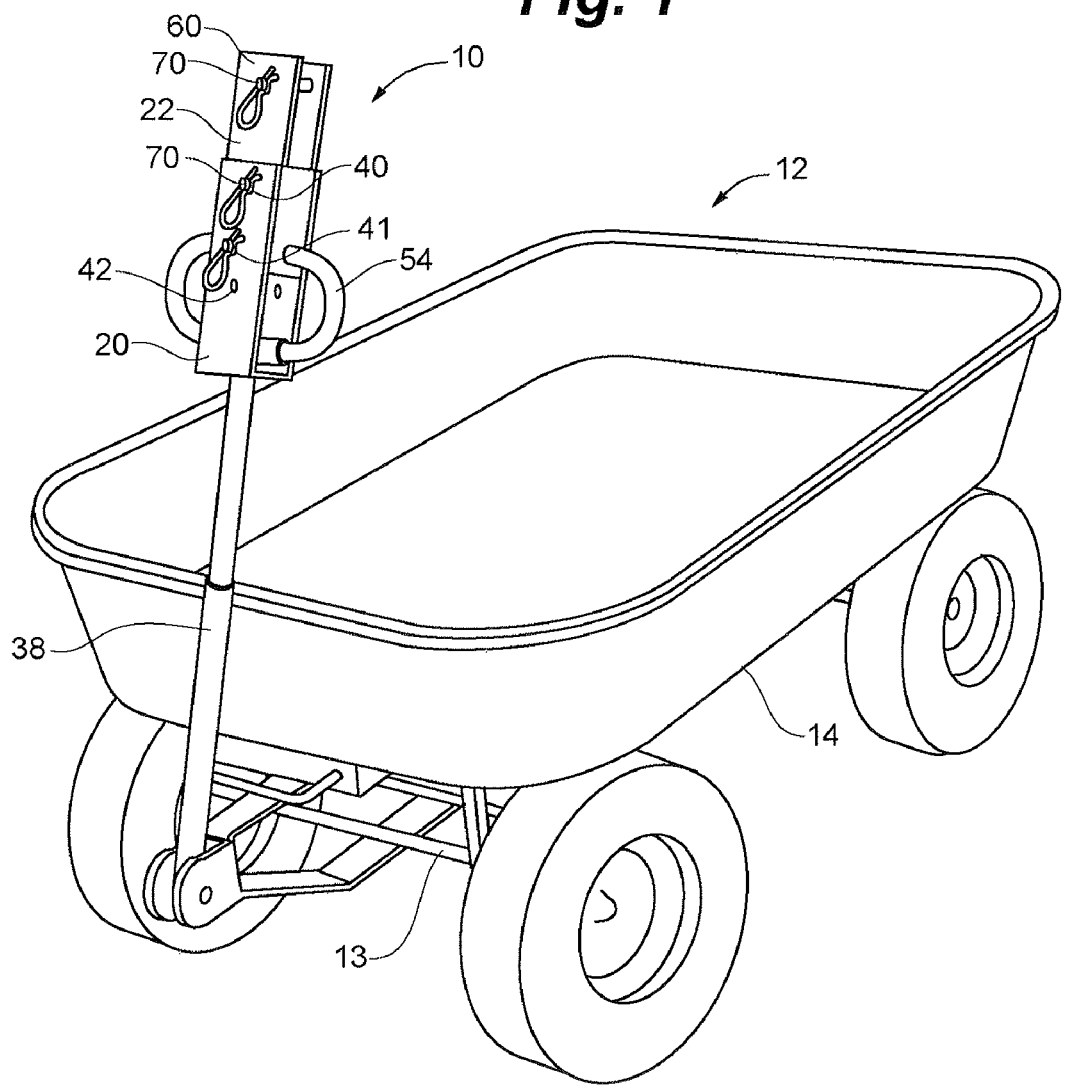
FIG. 1 is a perspective view of a trailer with a convertible handle according to an embodiment of the present invention.
Figure 2:
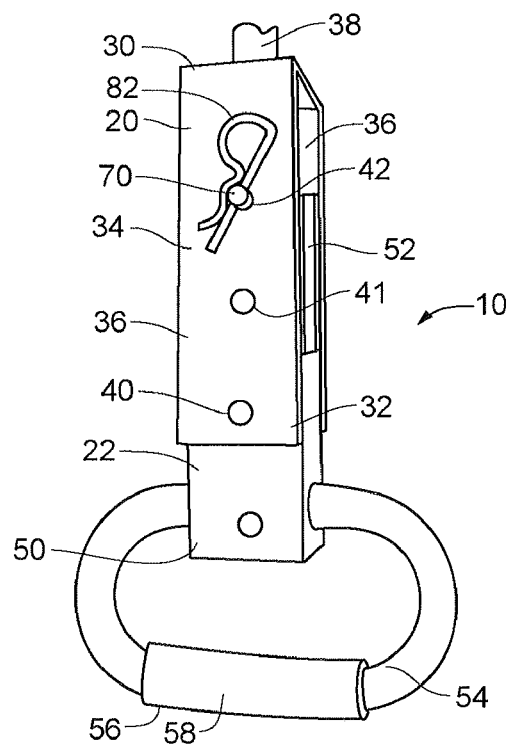
FIG. 2 is a top view of the convertible handle in a first configuration.
Figure 3:
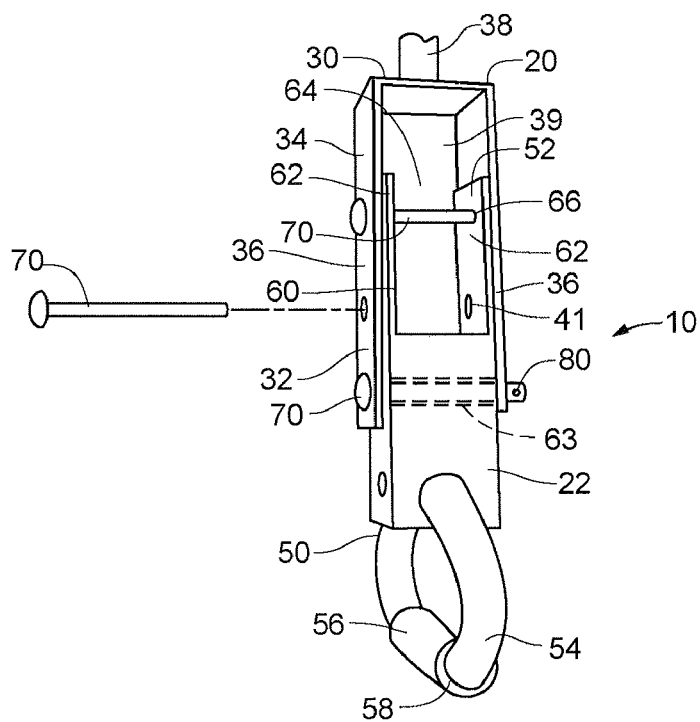
FIG. 3 is a side view of the convertible handle in the first configuration.
Figure 4:
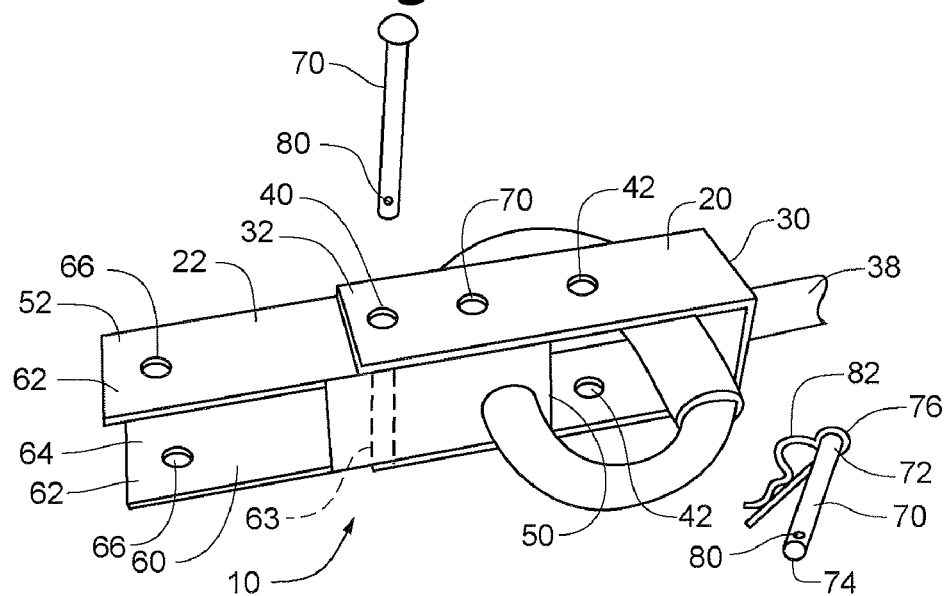
FIG. 4 is a perspective view of the convertible handle in a second configuration.
Figure 5:
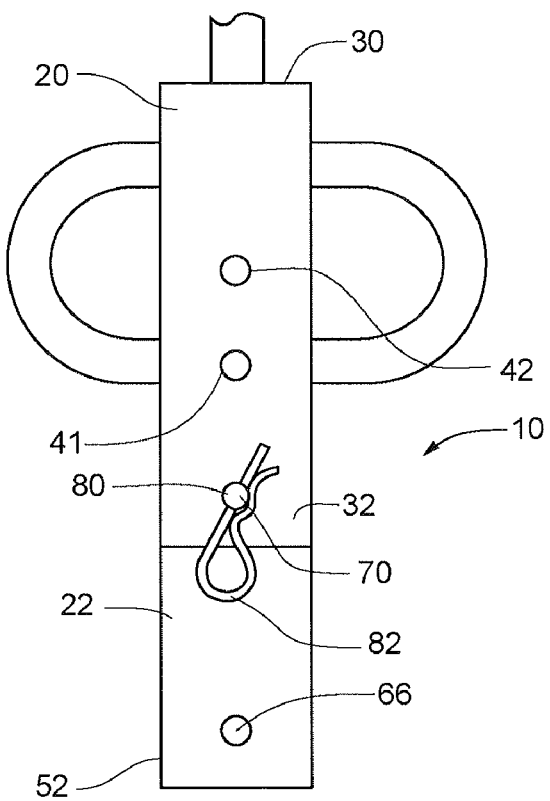
FIG. 5 is a top view of the convertible handle in the second configuration.

The invention is a convertible handle, depicted generally at 10 in the figures, that is suitable for use with towing an object such as a trailer, as illustrated at 12 in FIG. 1. The trailer generally includes a chassis 13 and a bed 14 supported on the chassis 13. The convertible handle 10 is adaptable for use in either a first configuration (FIGS. 2-3) or a second configuration (FIGS. 4-5).

When in the first configuration, the convertible handle 10 is adapted for manually towing the trailer 12. When in the second configuration, the convertible handle 10 is adapted for attachment to a towing vehicle such as a tractor. The convertible handle 10 is self contained, thereby permitting changes between the two configurations without the need to separately store parts that are not needed in one of the configurations.

The convertible handle 10 generally includes a tongue portion 20 and a handle portion 22. The handle portion 22 is preferably pivotally attached to the tongue portion 20 such that pivoting of the handle portion 22 with respect to the tongue portion 20 moves the convertible handle 10 between the first configuration and the second configuration.

The tongue portion 20 has a first end 30 and a second end 32. The first end 30 has a shaft 38 extending therefrom and is adapted for removably attaching the tongue portion 20 to a trailer, utility cart, or other towed vehicle 12. The second end 32 preferably has a clevis 34 that is defined by a pair of branches 36. Between the branches 36 a recess 39 is defined. Alternatively, the second end 32 may include only a single branch 36.

The branches 36 each have a first clevis pivot aperture 40 and a second clevis locking aperture 42 formed therein. The first clevis pivot apertures 40 are preferably axially aligned and are used for pivotally mounting the handle portion 22 with respect to the tongue portion 20. The second clevis locking apertures 42 are preferably axially aligned and are used for retaining the handle portion 22 in a stationary position with respect to the tongue portion 20.

The handle portion 22 has a first end 50 and a second end 52. The first end 50 (as most clearly illustrated in FIGS. 2 and 3) has a gripping region 54 that permits a person to hold on to the handle portion 22. The gripping region 54 preferably has a loop configuration.

The gripping region 54 is preferably oriented substantially transverse to the shaft 38. A gripping area 56 on gripping region 54 is preferably substantially straight to facilitate holding handle portion 22 in a person's hand. To enhance the ability to hold handle portion 22, the gripping area 56 is preferably covered with a resilient foam material 58.

The second end 52 preferably has a clevis 60 that is defined by a pair of branches 62 (as most clearly illustrated in FIGS. 4 and 5). Between the branches 62 a recess 64 is defined. The branches 62 each have a clevis aperture 66 formed therein. The clevis apertures 66 are preferably co-axially aligned. Alternatively, the second end 52 may include only a single branch 62 depending on the towing vehicle to which the convertible handle 10 is to be attached. The single branch 62 may captured between a clevis mounted on the towing vehicle At an intermediate position on the handle portion 22, a pivot aperture 63 is formed therein. The handle portion 22 may be pivotally coupled to the tongue portion 20 by bringing the clevis pivot apertures 40 into registry with the pivot aperture 63 and inserting a pin 70 therein. See FIG. 3. The handle portion 22 also preferably includes a locking aperture 68 formed therein between the pivot aperture 63 and the first end 50.

The convertible handle 10 preferably includes at least a pair of attaching pins 70. A first attaching pin 70 pivotally attaches the handle portion 22 to the tongue portion 20, as noted above. A second attaching pin 70 extends through the tongue portion 20 and the handle portion 22 to retain the handle portion 22 in a stationary position with respect to the tongue portion 20. A third attaching pin 70 may be retained in apertures 41 and utilized to attach the clevis 60 to a towing vehicle, as depicted in FIG. 1. Inclusion of the third pin 70 makes the convertible handle 10 more self contained, in that the means for coupling the handle 10 to the towing vehicle are also included and such means may be readily stored on the handle 10 when the handle 10 is in the configuration presenting the gripping portion 54, as depicted in FIG. 3.

An exemplary attaching pin 70 has a first end 72 and a second end 74, as most clearly illustrated in FIG. 4. At the first end 72, a head 76 is provided that is larger than the apertures in the tongue portion 20 and the handle portion 22. At the second end 74 of the attaching pin 70, a cotter pin hole 80 is preferably formed therein. When the attaching pin 70 is inserted through the tongue portion 20 and the handle portion 22, it is retained in place by the head 76 and a cotter pin 82, which is inserted through cotter pin hole 80. Other types of commonly used pins with retainers may be used as well.

In operation, the convertible handle 10 is oriented in the first configuration by orienting the second end 52 of the handle portion 22 away from the tongue portion 20. One of the attaching pins 70 is extended through the first clevis apertures 40 and the pivot aperture. The cotter pin 82 is then extended through the cotter pin hole 80.

In this configuration, the handle portion 22 is pivotable with respect to the tongue portion 20 from the first configuration (FIGS. 2-3) to an intermediate configuration (FIG. 6) and then to the second configuration (FIGS. 4-5).

When the handle portion 22 is oriented in the first configuration, one of the attaching pins 70 is extended through the second clevis apertures 42 and the clevis aperture 64 and one of the cotter pins 82 is extended through the cotter pin hole 80 to retain the handle portion 22 in the first configuration.

When it is desired to change the convertible handle 10 to the second configuration, the cotter pin 82 is detached from the attaching pin 70 and the attaching pin is removed from the second clevis apertures 42 and the clevis aperture 64. The handle portion 22 is then rotated with respect to the tongue portion 20 so that the first end 50 is oriented away from the tongue portion 20.

The attaching pin 70 is then extended through the second clevis apertures 42 and the locking aperture 68 and one of the cotter pins 82 is extended through the cotter pin hole 80 to retain the handle portion 22 in the second configuration.

While the gripping region 54 is illustrated as being a loop with both ends attached to the handle portion 22 in most of the figures, the concepts of the present invention are adaptable for use in with other configurations of the gripping region 54 such as a loop with only one end attached to the handle portion 22, as illustrated in FIG. 7.

It is contemplated that features disclosed in this application, as well as those described in the above applications incorporated by reference, can be mixed and matched to suit particular circumstances. Various other modifications and changes will be apparent to those of ordinary skill.

While the trailer with convertible handle of the present invention has been shown and described in detail, the invention is not to be considered as limited to the exact forms disclosed, and changes in detail and construction may be made therein within the scope of the invention without departing from the spirit thereof.

The invention claimed is:

1. A trailer, comprising:
   a convertible handle having a handle portion, the handle portion pivotally attached to a tongue portion, the handle portion having a first gripping portion end and a second clevis end and an intermediate pivot, the handle portion being pivotably shiftable about the intermediate pivot between a first disposition presenting the gripping portion end proximate an end of the tongue portion and a second disposition presenting the clevis end proximate the end of the tongue portion.

2. The trailer of claim 1, wherein a first end of the tongue portion has a shaft extending therefrom.

3. The trailer of claim 1, wherein a second end of the tongue portion has a clevis formed therein, wherein the clevis has a pair of branches.

4. The trailer of claim 1, wherein the convertible handle is shiftable between a first and a second configuration, a gripping region of the first gripping portion end being at least partially located in a tongue portion clevis of the second clevis end when the handle portion is in the second configuration.

5. The trailer of claim 1, wherein the handle portion has a pivot aperture formed therein intermediate the first gripping portion end and the second clevis end.

6. The trailer of claim 1, wherein the second clevis end on the handle portion has a pair of branches, wherein each of the branches has a clevis aperture formed therein.

7. The trailer of claim 1, wherein the handle portion is pivotably attached to the tongue portion with an attaching pin.

8. The trailer of claim 7, wherein the handle portion is at least partially covered with a resilient foam material.

9. A trailer, comprising:
a convertible handle having a tongue portion and a handle portion, the tongue portion having a first end and a second end, wherein the first end is suited for attachment to a trailer chassis, the second end of the tongue portion having a clevis formed therein, the handle portion being pivotably mounted in the clevis; and
the handle portion having a gripping region and an opposed clevis, the gripping region being shiftable to comprise a first configuration for use and the opposed clevis being shiftable to comprise a second, alternative configuration for use.

10. The trailer of claim 9, wherein the gripping region is at least partially disposed in the tongue portion clevis when the handle portion is in the second, alternative configuration for use.

11. The trailer of claim 9, wherein the handle portion has a pivot formed therein intermediate the gripping region and the opposed clevis.

12. The trailer of claim 9, wherein the clevis on the handle portion has a pair of branches, wherein each of the branches has an intermediate clevis aperture formed therein.

13. The trailer of claim 9, wherein the handle portion is pivotably attached to the tongue portion with a readily removable attaching pin.

14. The trailer of claim 9, wherein the handle portion is at least partially covered with a resilient foam material.

15. The trailer of claim 9, wherein the handle portion of the convertible handle is self contained, such that no components thereof need be separately stored without regard to whether the first and second configurations for use is selected.

16. A method of operating a trailer, the method comprising:
selectively pivoting a handle portion of a convertible handle to a first configuration where a gripping region of the handle portion is presented proximate an end of a tongue portion of the convertible handle; and
selectively pivoting the handle portion of the convertible handle to a second configuration where a clevis of the convertible handle is presented proximate the end of the tongue portion of the convertible handle,
wherein the pivoting occurs intermediate the gripping region and the clevis.

17. The method of claim 16, including selectively retaining the handle portion in the first configuration by extending an attaching pin through the tongue portion and the handle portion.

18. The method of claim 16, including selectively retaining the handle portion in the second configuration by extending an attaching pin through the tongue portion and the handle portion.

19. The method of claim 18, including at least partially disposing the gripping region in the tongue portion when the handle portion is presented proximate the end of the tongue portion.

* * * * *